P. BENSON.
GEOMETRICAL INSTRUMENT.
APPLICATION FILED MAY 28, 1917.

1,306,165.

Patented June 10, 1919.
2 SHEETS—SHEET 1.

Inventor
Peter Benson
By Herbert E. Smith
Attorney

P. BENSON.
GEOMETRICAL INSTRUMENT.
APPLICATION FILED MAY 28, 1917.

1,306,165.

Patented June 10, 1919.
2 SHEETS—SHEET 2.

Inventor
Peter Benson

By
Herbert E. Smith
Attorney

UNITED STATES PATENT OFFICE.

PETER BENSON, OF KOOTENAI, IDAHO.

GEOMETRICAL INSTRUMENT.

1,306,165.  Specification of Letters Patent.  Patented June 10, 1919.

Application filed May 28, 1917. Serial No. 171,520.

*To all whom it may concern:*

Be it known that I, PETER BENSON, a citizen of the United States, residing at Kootenai, in the county of Bonner and State of Idaho, have invented certain new and useful Improvements in Geometrical Instruments, of which the following is a specification.

The present invention relates to improvements in geometrical instruments, designed particularly for use by carpenters, and embodied for convenience in the usual hand-saw.

The primary object of the invention is the equipment of the carpenter's saw with features in order that the saw blade may be used as an instrument in laying out different kinds of work required in carpentry, and that this work may be accomplished with accuracy and facility.

The invention consists in the arrangement on the saw blade of certain geometrical symbols and division markings with relation to a center point whereby the measurement and laying off of lines, angles, surfaces, etc., may be accomplished, particularly as applied to the finding of angles for triangles, miters, etc.; for square and plumb cuts of material, and for making bevel cuts on different kinds of rafters.

In the accompanying drawing I have illustrated one complete example of the physical embodiment of my invention constructed and arranged according to the best mode I have so far devised for the practical application of the principles of my invention.

Figure 1:
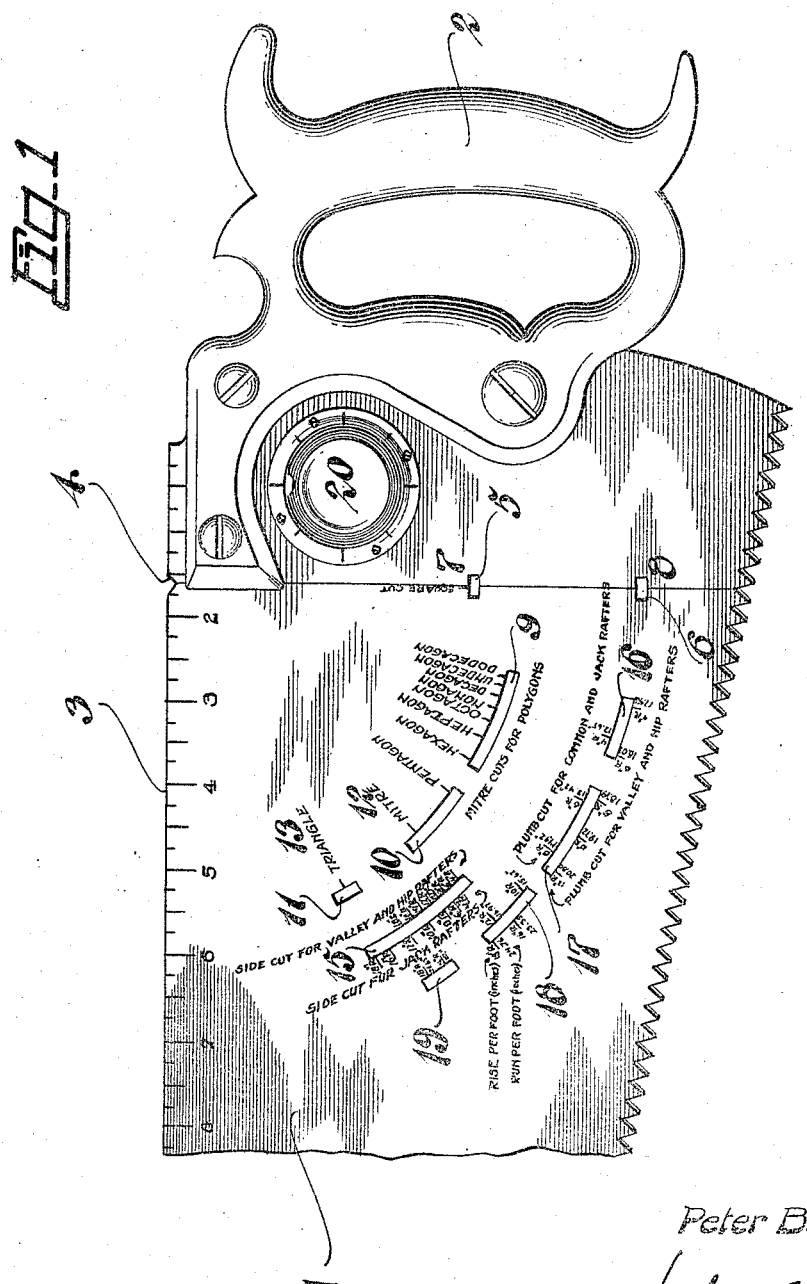
Figure 2:
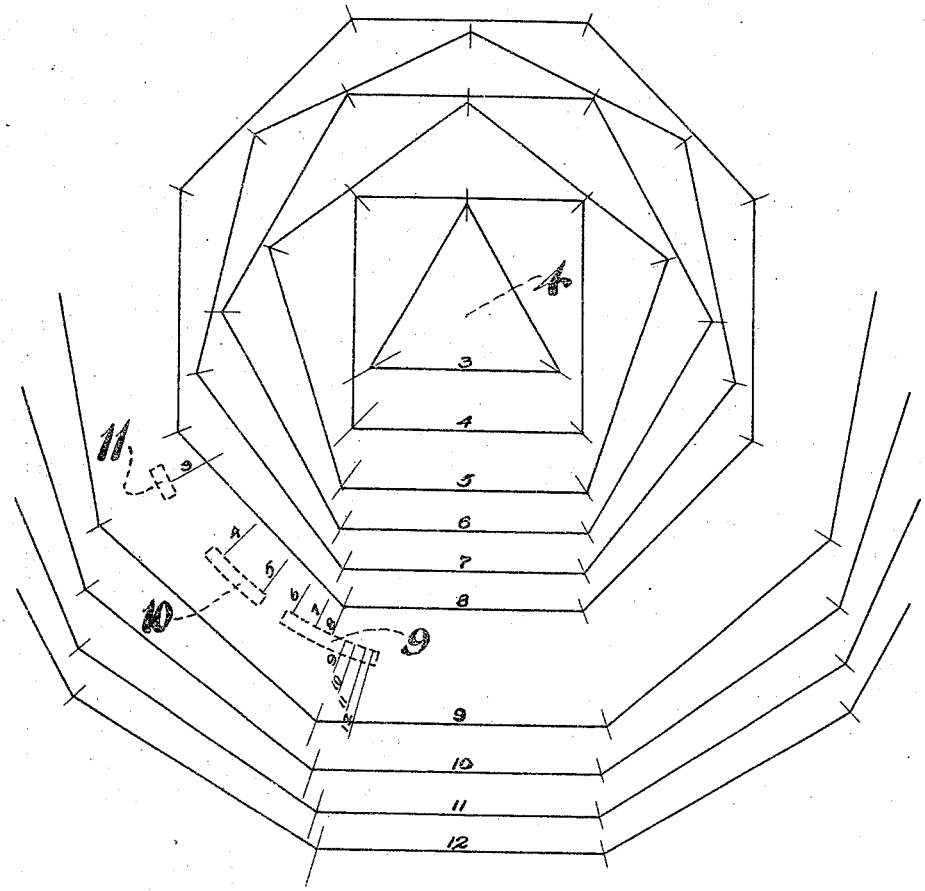

The drawing shows an end of a hand-saw of usual type with the geometrical embodiment of my invention laid out thereon, as in Figure 1. Fig. 2 illustrates diagrammatically several polygons that have been outlined according to my invention.

In the preferred form of the invention as shown in the drawing, the saw blade is indicated by the numeral 1 and the handle by the numeral 2. The back of the blade has a straight edge 3 which may be used for ruling and other usual functions, and a scale which may be in inches is laid out along the straight edge for making required measurements on straight lines.

The geometrical markings on the saw blade are all laid off with relation to a common point indicated by the notch 4 cut in the straight edge of the blade, and the point of this notch may be used as the centering point for a tool or other sharpened article adapted to fit in the notch and act as a center or fulcrum to swing the blade while manipulating it in laying off work.

Perpendicular to the straight edge, and beginning at the apex or point of the notch 4, a line may be drawn across the blade intersecting two slots 5 and 6 in the blade and the walls of these slots are marked as at 7 and 8. By the utilization of these marked slots and in conjunction with the straight edge the saw blade may be used as an angle to make or lay off a cut at right angles to the straight edge.

At predetermined points from the perpendicular line, in this instance to the left of the line, and arranged in the arc of a circle are three slots 9, 10, and 11, all having marks thereon by which miter cuts may be laid off, as for instance the mark 12 designated "Mitre" and located 45° from the perpendicular line, and the mark 13 designated "Triangle" located 60° from the perpendicular line by means of which the angles for triangles may be instantly determined.

In addition to the above markings, the slot 9 and slot 10 have markings whereby geometrical polygonal figures may be laid off using the perpendicular line and the straight edge to work from. Beginning the markings at the point nearest the perpendicular line, they read Dodecagon, Undecagon, Decagon, Nonagon, Octagon, Heptagon, Hexagon, and Pentagon, the names of course designating the geometrical figures, and sides to such figures. Thus, as seen in Fig. 2 of the drawings, where the diagram of several figures is shown, if a heptagon or seven side figure is to be drawn, a perpendicular line extending from the perpendicular line or square-line between marks 7 and 8, to the Heptagon mark, will be one half the length of the base line of the heptagon, and parallel with the straight edge. To double the length of this line, a tool may be inserted in the notch 4 and the saw blade swung around on the tool as a center until the Heptagon mark coincides with a line previously drawn on the surface perpendicular to the straight edge. The mark 7 or the mark 8 may be used in connection with the notch 4 as a point at which to indicate a radial line which when it intersects the base line will indicate the terminus of the heptagon base line and then with the point where the tool has been inserted, *i. e.*, the point of the notch 4, as a center, a circle may be inscribed touching the ends of the base line, and then the other six sides of the heptagon may be stepped off about the circle and the intersections connected to complete the figure. The other figures designated are drawn in the same manner, in all cases with the base line of the figure parallel with the straight edge of the saw, and of course figures of different sizes may be laid off as desired.

In addition to the work of laying off polygons, other markings are provided, also of predetermined location, by means of which rafters may be beveled. As for instance, the side cuts for valley and hip rafters may be determined by referring to the markings in inches, located along the arcuate slot 15, at the inner wall, and at the outer wall of said slot the side cuts for jack rafters are determined, the angle of the cut in all instances being found by ascertaining and marking the angle between the perpendicular line and the specified dimension wanted.

A third arrangement of slots is indicated by the numbers 16, 17, 18, 19, to be used in conjunction with the mark 8 of the perpendicular line for ascertaining, at the inner wall of the slots, the plumb cuts for common and jack rafters, and at the outer wall of these slots markings are provided for determining the plumb cut for valley and hip rafters, and in connection with these cuts, the circular plumb level or spirit level 20 fixed to the blade adjacent the handle, may be used.

In laying out rafters as on a hip roof, the straight edge or scale side of the saw 3 is placed along the rafter beam with the notch 4 near one end thereof. Then by referring to the proper scale, in this case scale 15, and finding thereon the rise per foot the roof is to have as shown upon the plans, and placing a mark upon the timber to correspond with the mark along the edge of the slot 15 and then drawing a line from the notch 4 to this point, the true side cut for the rafter will be correctly indicated. The same method and scale applies for finding the cut for jack rafters. This cut will be marked upon the timber, the narrow way, and will be used in every case where the rafter does not join with the ridge at right angles. To secure the plumb cut for either common or jack rafters, or for valley and hip rafters, the latter of which are marked from the opposite side of the beam or timber, reference to the scales 16, 17, 18 and 19 is made and by placing the straight edge or edge 3 of the saw, as earlier indicated, along the beam and selecting out the proper rise per foot and noting through the slot a corresponding mark, the proper plumb cut will be indicated, this cut being placed upon the side with the greatest width of the timber.

Frequently it happens that it is necessary to make both a side cut and a plumb cut on a timber in order to properly construct the roof, as for instance, where a valley occurs, the main rafters when striking the valley will be plumb on the side of the timber having the greater dimension and will also have a side cut to match the bevel or angle of the valley to which it is fitted. When this condition occurs the markings are effected in the manner above indicated by the use of the scale 15 in conjunction with either of the scales 16, 17, 18 or 19.

What I claim is:

A geometrical instrument having a body formed with a straight edge and scale and a notch in the straight edge, a line on the body perpendicular to the straight edge and terminating in the notch and slots in the body intercepting this line, a series of concentrically arranged groups of slots between the straight edge and the perpendicular line and inscribed in the body with said notch as the center, and markings on the edges of said concentric slots spaced at predetermined distances from the perpendicular line.

In testimony whereof I affix my signature.

PETER BENSON.

Copies of this patent may be obtained for five cents each, by addressing the "Commissioner of Patents, Washington, D. C."